United States Patent [19]

Sang et al.

[11] Patent Number: 4,999,323

[45] Date of Patent: Mar. 12, 1991

[54] PRODUCTION OF CERAMIC POWDERS BY EMULSION PRECIPITATION PROCESSES AND THE PRODUCTS THEREOF

[75] Inventors: Jean V. Sang, Kingston; Carson J. Ogilvie, Yarker, both of Canada

[73] Assignee: Alcan International Limited, Montreal, Canada

[21] Appl. No.: 227,755

[22] Filed: Aug. 3, 1988

[30] Foreign Application Priority Data

Aug. 19, 1987 [CA] Canada .................................. 544,868

[51] Int. Cl.$^5$ ................................................ A61J 5/00
[52] U.S. Cl. ..................................... 501/103; 423/189; 423/594; 423/600; 264/4.1; 264/11.12; 264/13
[58] Field of Search ................. 423/594, 600, 12, 186, 423/189; 501/103; 264/13, 11, 4.1

[56] References Cited

U.S. PATENT DOCUMENTS

| | | | |
|---|---|---|---|
| 3,535,264 | 10/1970 | Hackstein et al. | 252/301.1 |
| 3,970,580 | 7/1976 | Zimmer | 252/301.1 |
| 4,352,717 | 10/1982 | Watanabe et al. | 159/4 E |

OTHER PUBLICATIONS

Sugimoto, "Preparation of Monodispersed Colloidal Particles", Advances in Laido and Interface Science, 28(1987), pp. 65–108.
Boutonnet et al., "The Preparation of Monodisperse Colloidal Metal Particles from Microemulsions", Colloid Surf. 5(1982), 209.
Nagy et al., "Preparation of Monodispersed Nickel Catalysts Using Reversed Micellar Systems", Prep. of Catalysts III (1983), 193.
Lufimpadio et al., "Preparation of Colloidal Iron Boride Particles in the CTAB–n–Hexanol–Water Reversed Micellar System", Surfactants in Solution (1984), 1483.
Gobe et al., "Preparation and Characterization of Monodisperse Magnetic Sols in W/O Microemulsion", J. Colloid and Interface Sci., 93(1983), 293.
Dvolaitzky et al., "Silver Chloride Microcrystals Suspensions in Microemulsion Media", J. Dispersion Sci. and Technol., 4(1) (1983), 29.
Konno et al., "Preparation of Barium Carbonate Fine Particles in W/O Microemulsion", Nippon Kagaku Kaishi, 6 (1984), 815.
K. Kandori et al., "Preparation of $CaCo_3$ Particles in Water Pool in Nonaqueous Nonimic Surfactant Solutions", J. Dispers. Sci & Tech., 8(5 & 6) (1987), 477.

Primary Examiner—William R. Dixon, Jr.
Assistant Examiner—Chris Gallo
Attorney, Agent, or Firm—Cooper & Dunham

[57] ABSTRACT

The invention provides new processes for the production of precursor powders for ceramic materials by emulsion precipitation, the new processes permitting the economic production with at least some cations of uniformly small size particles (1 micrometer or less) to result in corresponding dense microstructures upon sintering the precursor powder to produce the ceramic material. The processes require the production of a fine water-in-oil type emulsion of an aqueous solution of the desired cation or cations in a non-miscible liquid, usually an oil, such as a saturated hydrocarbon, a suitable surfactant usually also being employed, The emulsion preferably has an aqueous particle size of 0.1 micrometer or less, produced by a mechanical emulsator. A gaseous reactant, preferably ammonia, or a mixture of ammonia with a neutral diluent gas, is bubbled through the emulsion to contact it and react with the cations, without breaking the emulsion by physical and/or chemical action. The emulsion becomes alkaline and may gel if the aqueous content is sufficiently high. Upon removal of the water and the non-miscible liquid, by heating, spray drying, freezing, etc., the particles that remain are found to have retained their fine structure without agglomerating. If one or more of the cations is of the type that forms complexes with ammonia it may be preferred to instead use a non-complexing gaseous reactant, such as carbon dioxide.

13 Claims, No Drawings

PRODUCTION OF CERAMIC POWDERS BY EMULSION PRECIPITATION PROCESSES AND THE PRODUCTS THEREOF

FIELD OF THE INVENTION

This invention is concerned with new processes for the production of precursor powders from which ceramic materials can be produced and which are improvements to the known emulsion precipitation processes.

REVIEW OF THE PRIOR ART

A now well known type of process for the production of such precursor powders, usually referred to in the art and hereinafter as ceramic powders, involves the precipitation of a precursor of the powder from a homogenous solution containing the desired cations. The solution is mixed with a reagent which will precipitate the cations in the form of easily reducible compounds thereof, e.g. hydroxides, carbonates, oxalates, etc., which are separated from the liquid and sintered to reduce them to the respective oxides. These processes have the advantages that the reaction conditions are usually mild, relatively rapid and easily controlled, and the components of a mixed powder can readily be thoroughly mixed together at the atomic level. Because of their small crystallite size, the resulting powders are highly surface reactive and therefore sinter to the desired final product at a lower temperature than with, for example, post-mixed powders.

The processes proposed to date do have some limitations. For example, the chemical composition of the resulting powder is often difficult to control since, depending upon the chemistry of the different cations in the mixture, their interaction with one another, and with the precipitating agent, the cation ratio in the solution is not necessarily found in the precipitate. It has been shown that uniform unagglomerated powders of small particle size lead to the desired dense and uniform microstructure in the sintered product at relatively low sintering temperatures, but the reaction products tend to be aggregated powders which require further extensive treatments, such as milling and/or washing the powders with organic solvents to permit subsequent fabrication. It is also found that the results can vary widely, owing to the extreme sensitivity of the processes to small variations in conditions and procedures.

In order to at least mitigate these problems it is now common to disperse the homogenous, usually saturated, aqueous solution of the cation or cation mixture in air or a non-miscible liquid in the form of what is termed a "microemulsion", i.e. an emulsion in which the droplets of the dispersed aqueous solution are as small as possible. The aqueous phase is then removed as rapidly as possible by any one of a number of possible techniques, e.g. vacuum evaporation, spray drying, freeze drying or dropping into hot petroleum, the very fine droplets facilitating the application of large temperature gradients and reducing the possibility of agglomeration of the particles as they come out of solution. Nevertheless some agglomeration appears to occur, perhaps due to coalescence of the droplets as they dry, and the resultant powders are of particle size that in this art is still considered to be large, i.e. from 1 to 15 micrometers in average size.

DEFINITION OF THE INVENTION

It is a principal object of the invention therefore to provide new emulsion precipitation processes for the production of such precursor ceramic powders.

It is a more specific object to provide such new processes that permit the economic production of such precursor ceramic powders of sizes smaller than 1 micrometer.

In accordance with the present invention there is provided emulsion precipitation processes for the production of precursor powders for the production of ceramic materials comprising the steps of:
  (a) producing an aqueous solution of the respective cation or mixture of cations;
  (b) dispersing the aqueous solution in a non-miscible liquid to form an emulsion of aqueous particles in the non-miscible liquid;
  (c) contacting the emulsion with a gaseous reactant for the cation or cations that will react with the cation or cations to form a precipitate without breaking the emulsion; and
  (d) subsequently removing the aqueous and non-miscible liquids and producing the respective precursor powders.

Preferably, the aqueous solution constitutes from 30% to 70% by volume of the total volume of the emulsion.

Preferably also the emulsion includes from about 2% to 10% by volume of the aqueous solution of a surfactant to stabilize the emulsion.

The gaseous reactant may be ammonia, which may be contacted with the emulsion until it reaches a pH of about 10 to 11.

The gaseous reactant may be carbon dioxide, which may be contacted with the emulsion until it reaches a constant pH of about 3, and thereafter the reacted emulsion may be contacted with ammonia until it reaches a pH of at least 6.

The ammonia and/or the carbon dioxide may be diluted with a neutral gas to constitute from 30% to 70% by volume of the mixture, a suitable diluent being nitrogen.

The liquids may be removed by heating or by spray drying.

DESCRIPTION OF THE INVENTION

The aqueous solution is made using distilled water of the purity required to avoid introduction of unwanted cations, the wanted cation or cations being introduced in the form of a suitable water soluble salt or salts, e.g. carbonate, acetate, etc. Various non-miscible organic solvents can be used and nonpolar solvents such as saturated hydrocarbons are preferred to result in water-in-oil emulsions. The fraction of the aqueous solution theoretically can be as high as 74% by volume, which corresponds to the theoretical maximum volume that can be occupied by closely packed uniform spherical particles. In practice a smaller fraction of about 30% to 70% by volume, more usually 30% to 50%, and particularly about 40% is employed, since at the higher concentrations considerable distortion occurs from the usual spherical shape of the dispersed phase leading to non-uniformity in size of the resultant powders. It is found that with decreasing fractions of aqueous solution that the emulsions become increasingly viscous, particularly below 40%, and this becomes a limiting factor to be considered.

The production of sufficiently stable emulsions will usually require the use of a surfactant, usually in the range of 2% to 10% by volume of the aqueous solution. If a saturated hydrocarbon is used as the "oil" (such as n-heptane) the surfactant can be non-ionic, such as the esters of polyhydric alcohols (e.g. sorbitan monooleate or trioleate) or ethers of polyoxyalkylene glycol (e.g. tertoctylphenoxyethanol). The surfactant can also be anionic, such as sulphonated petroleum salts, but with such surfactants the cation should be decomposed upon heating, so that materials with ammonium cationic groups are preferred. It is also preferred when an anionic surfactant is used to use a co-surfactant, usually a long chain alcohol. It was also found that the amount of surfactant that was required could be reduced by use of a mixture of about 90% to 10% by volume of non-ionic surfactant (e.g. sorbitan monooleate) and the remainder an ionic surfactant (e.g. ammonium monoethyphenyl phenol monosulfate). For n-heptane a mixture of about 80% of the non-ionic surfactant and 20% of the ionic surfactant was preferred. It was found preferable to dissolve the surfactant, or mixture thereof, into the non-miscible liquid prior to adding the aqueous solution, since this resulted in a more stable emulsion.

The dispersion of the aqueous solution into the non-miscible liquid may be obtained by any physical means, but emulsators of the Pohlman whistle type are preferred since they are found to produce emulsions of the necessary small particle size, with homogenous particle size distribution and consequent good stability during the gas reactant bubbling step. Preferably, the aqueous droplets are of particle size of about 0.1 micrometer diameter (1,000 Angstroms), as indicated by the emulsion appearing transparent or translucent, and the preparation of such fine emulsions may require the adjustment of the quantity of surfactant between the preferred range of 2% to by volume of the aqueous phase, and also adjustment of the temperature of the emulsion, usually to be in the range 15° C. to 80° C.

The preferred gaseous reactant is ammonia which is at present believed to react with the water to form ammonium hydroxide with subsequent reaction of this with the corresponding cations to form respective hydroxides. If pure ammonia generates too vigorous a reaction so that the emulsion is in danger of breaking by overheating, then it can be diluted with a neutral carrier gas such as nitrogen or argon, for example, so as to constitute only from about 5% to about 70% of the total. The emulsion can also be cooled to control its temperature.

A number of cations, such as copper, nickel and platinum, form complexes with ammonia, and processes employing such cations are found with ammonia as the gaseous reactant to result in agglomerated powders that are of larger than desired particle size. It is preferred therefore with such cations to employ carbon dioxide as the gaseous reactant to result in precipitation of the respective carbonates within the aqueous phase. As with ammonia the gas is most readily contacted with the emulsion by bubbling it through at a rate such that the emulsion is not damaged either by the physical action of the bubbling, or by the chemical action. The contacting will usually be continued until the pH has reached a steady state which will usually be of the order of 3. The emulsion subsequently is at least neutralized, if it cannot be rendered alkaline and gelled without complex formation, by bubbling ammonia through it until it has reached a pH of at least 6, usually between 6 and 7. As indicated, it may be found that attempts to render the emulsion more alkaline than neutral results in the formation of complexes and subsequent agglomeration of the produced particles. Again, if it is found that the use of pure ammonia produces too vigorous a chemical action it can be diluted with a carrier gas, or the reacting emulsion can be cooled.

DESCRIPTION OF SPECIFIC EXAMPLES

Processes embodying the invention will now be described, by way of specific examples thereof.

EXAMPLE 1

(Sodium beta alumina)

A precursor saturated aqueous solution was made up of sodium and aluminum nitrates in distilled water that would result in $Na_2O.11\,Al_2O_3$ after drying and decomposition, the solution comprising 11.4 g/L $NaNO_3$ and 312 g/L $Al(NO_3)_3$. The aqueous solution was emulsified at room temperature (20° C.) in n-heptane, the emulsion consisting of 40% by volume of the aqueous solution, 60% by volume of the n-heptane, and including 5% by volume of the aqueous phase of sorbitan monooleate as a surfactant, using an emulsator of the Pohlman whistle type (Sonic Corp., Stratford, Conn., U.S.A.). The emulsion that was obtained was transparent, or at least translucent, to light indicating that the aqueous droplets were of about 0.1 micrometer (1,000 Angstroms) diameter or less. Ammonia gas was then bubbled through the emulsion at a rate of about 0.8 litre/minute for a period of about 60 minutes, taking care not to break the emulsion either by the chemical reaction or the physical action of the bubbling, until its pH increased to 11. The water and n-heptane were then removed by spray drying. The resulting powder was then calcined at about 1,000° C. for a period of about 2 hours to result in a powder of sub-micron size particles (0.1 to 0.2 micrometer) that were unagglomerated and consisted of single phase beta alumina.

EXAMPLE 2

(Alumina)

An aqueous solution containing 310 g/L of aluminum nitrate ($Al(NO_3)_3$) was emulsified in heptane in the ratio by volume of 40% to 60%, using 5% by volume of the aqueous solution of sorbitan monooleate as a surfactant added first to the heptane. A sample of the emulsion was spray dried without reaction with a gaseous reactant and produced powdered nitrate ready for calcining of particle size in the range 10 to 20 micrometers. The emulsion was also reacted with ammonia by bubbling it through until the pH had increased to about 10 to 11. The water and heptane were removed by spray drying and the resulting powder was calcined at about 1,000° C. for about 2 hours to result in unagglomerated alumina powder of spherical particle shape and of size distribution within the relatively narrow range 0.8 +0.2 micrometer.

EXAMPLE 3

(Alumina)

The procedure of Example 2 was repeated using hexane as the non-miscible organic phase in which 50% by volume of the same aluminum nitrate solution was emulsified using 5% sorbitan monooleate as surfactant.

The resulting calcined alumina consisted of spherical particles of a mean diameter of 1.0 micrometer.

EXAMPLE 4

(Partially stabilized zirconia)

An aqueous solution containing 1 mole/L zirconia oxychloride (ZrOCl) and 3 mole percent yttrium nitrate (Y(NO$_3$)) was emulsified in heptane in the ratio by volume of 40% to 60%, using 2% by volume of the aqueous solution of sorbitan monooleate as the surfactant. The emulsion was treated in accordance with the invention by bubbling through ammonia until its pH reached the value 11. The water and heptane were removed by spray drying and the resultant powder was calcined at 700° C. for 2 hours. The calcined powders that resulted had a particle size in the range less than 0.5 micrometer and sintered to full theoretical density after 2 hours at 1,450° C. to result in fine grained bodies of uniform microstructure.

EXAMPLE 5

(Lithium ferrite)

An aqueous solution containing 1,010 g/L of ferric nitrate (Fe(NO$_3$)$_3$.9H$_2$O) and 34 g/L of lithium nitrate (LiNO$_3$) in the volume ratio of 40% to 60% was emulsified using 5% by volume sorbitan monooleate as the surfactant. Ammonia gas was bubbled through the emulsion until the pH had reached 11 and the water and heptane removed by spray drying. The powder that resulted was calcined at 600° C. for 2 hours to produce a magnetic powder consisting of single phase lithium ferrite (Li$_{0.5}$Fe$_{2.5}$O$_4$) particles of spherical form and of size distribution between 0.1 and 0.5 micrometer.

EXAMPLE 6

(Nickel ferrite)

An aqueous precursor solution of 638.8 g/L ferric chloride (FeCl$_3$) and 311 g/L nickel nitrate was prepared and emulsified with heptane in the volume ratio of 40% to 60% using 5% sorbitan monooleate as the surfactant. Since nickel is one of the ions that tends to complex with ammonia it was preferred instead to contact the emulsion with carbon dioxide gas, which was bubbled through the emulsion until a pH value of about 3 was achieved with precipitation of both iron and nickel ions as the respective carbonates. Thereafter the emulsion was neutralized by bubbling ammonia gas through until a nearly neutral pH of about 6 to 7 had been achieved. The emulsion was then spray dried and the dried material calcined at 600° C. for 2 hours to result in magnetic single phase nickel ferrite (Fe$_2$O$_4$Ni) of particle size in the range 0.1 to 0.2 micrometer.

We claim:

1. An emulsion precipitation process for the production of precursor powders for the production of ceramic materials, characterised by the steps of:
   (a) producing an aqueous solution of the respective cation or mixture of cations;
   (b) dispersing the aqueous solution in a non-miscible liquid to form an emulsion of aqueous particles in the non-miscible liquid of average particle size in the range 0.1 to 1 micrometer, the emulsion including from about 2% to 10% by volume of a surfactant to stabilize the emulsion;
   (c) contacting the emulsion with a gaseous reactant for the cation or cations that will react with the cation or cations to form a precipitate without breaking the emulsion; and
   (d) subsequently removing the aqueous and non-miscible liquids and producing the respective precursor powders.

2. A process as claimed in claim 1, characterized in that the aqueous solution constitutes from 30% to 70% by volume of the total volume of the emulsion.

3. A process as claimed in claim 1, wherein the surfactant comprises a mixture of a non-ionic surfactant and an ionic surfactant, and wherein the surfactant is dissolved into the non-miscible liquid prior to the addition of the aqueous solution thereto.

4. A process as claimed in claim 1, characterized in that the non-miscible liquid is an oil.

5. A process as claimed in claim 1, wherein the gaseous reactant is ammonia, or is a mixture of ammonia and a neutral diluent gas comprising from about 5% to about 70% by volume of the ammonia, and the ammonia is contacted with the emulsion until said emulsion reaches a pH of about 10 to 11.

6. A process as claimed in claim 1, wherein the gaseous reactant is carbon dioxide and is contacted with the emulsion until it reaches a constant pH of about 3.

7. A process as claimed in claim 1, wherein the gaseous reactant is carbon dioxide which is contacted with the emulsion until said emulsion reaches a constant pH of about 3, and wherein the reacted emulsion is contacted with ammonia, or with a mixture of ammonia and a neutral diluent gas comprising from about 5% to about 70% by volume of ammonia, until it reaches a pH of at least 6.

8. A process as claimed in claim 1, characterized in that the aqueous and non-miscible liquids are removed by heating to a sufficient temperature for a sufficient time.

9. A process as claimed in claim 1, characterised in that the aqueous and non-miscible liquids are removed by spray drying.

10. A process as claimed in claim 4, wherein the gaseous reactant is ammonia or is a mixture of ammonia and a neutral diluent gas comprising from about 5% to about 70% by volume of ammonia, and wherein the ammonia is contacted with the emulsion until said emulsion reaches a pH of about 10 to 11.

11. A process as claimed in claim 4, wherein the gaseous reactant is carbon dioxide which is contacted with the emulsion until said emulsion reaches a constant pH of about 3, and wherein the reacted emulsion is contacted with ammonia, or with a mixture of ammonia and a neutral diluent gas comprising form about 5% to about 70% by volume of ammonia, until said emulsion reaches a pH of at least 6.

12. A process as claimed in claim 3, wherein the gaseous reactant is ammonia or is a mixture of ammonia and a neutral diluent gas comprising from about 5% to about 70% by volume of ammonia, and wherein the ammonia is contacted with the emulsion until it reaches a pH of about 10 to 11.

13. A process as claimed in claim 3, wherein the gaseous reactant is carbon dioxide which is contacted with the emulsion until said emulsion reaches a constant pH of about 3, and wherein the reacted emulsion is contacted with ammonia, or with a mixture of ammonia and a neutral diluent gas comprising form about 5% to about 70% by volume of ammonia, until said emulsion reaches a pH of at least 6.

* * * * *